United States Patent [19]

Staudner

[11] Patent Number: 4,928,421

[45] Date of Patent: May 29, 1990

[54] FISHHOOK DEVICE AND METHOD OF MAKING SAME

[75] Inventor: Rupert A. Staudner, Margate, Fla.

[73] Assignee: Janet L. Staudner, Margate, Fla.

[21] Appl. No.: 404,785

[22] Filed: Sep. 8, 1989

Related U.S. Application Data

[63] Continuation-in-part of Ser. No. 270,015, Nov. 14, 1988, abandoned.

[51] Int. Cl.$^5$ ............................................. A01K 83/02
[52] U.S. Cl. ...................................................... 43/36
[58] Field of Search ...................................... 43/35, 36

[56] References Cited

U.S. PATENT DOCUMENTS

| | | | |
|---|---|---|---|
| 556,694 | 3/1896 | Robinson | 43/36 |
| 807,135 | 12/1905 | Smith | 43/36 |
| 1,510,774 | 10/1924 | Gauthier | 43/36 |
| 2,223,946 | 12/1940 | Binkowski | 43/36 |
| 2,531,941 | 11/1950 | Kissell | 43/36 |

Primary Examiner—M. Jordan
Attorney, Agent, or Firm—Steele, Gould & Fried

[57] ABSTRACT

A fishhook device includes a standard fishhook having a barb, bend, shank and eye. At least one piece of wire can be attached at one end of the shank of the fishhook, preferably substantially adjacent to the eye. The wire is biased by at least one biasing bend to an extended position wherein the free end is distanced from the shank of the hook, and can be flexed to a position wherein the wire is adjacent and substantially parallel to the shank. A retaining ring is positioned around the wire and the shank to keep the wire in the flexed position, and is the point of attachment for the fishing line. A loop in the wire is preferably provided substantially adjacent to the attached end as a guide for the fishing line. Movement of the hook relative to the fishing line will cause the retaining ring to slide over the wire to release the wire to the extended position, such that swallowing of the hook by the fish will be substantially prevented.

22 Claims, 3 Drawing Sheets

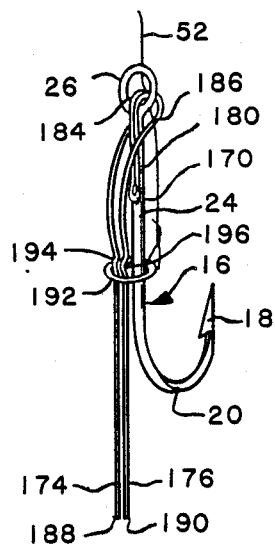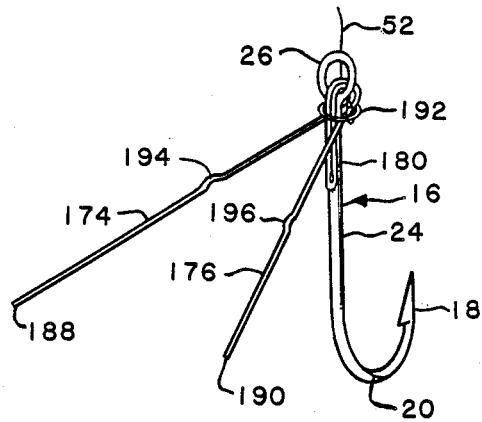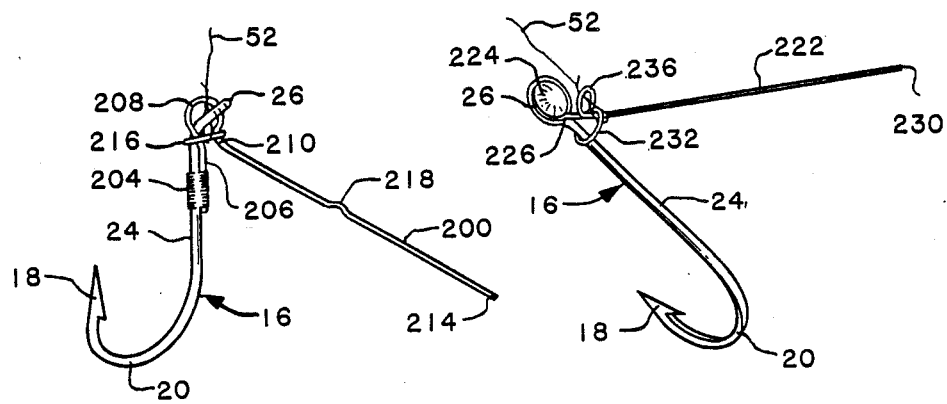
FIG. 8
FIG. 9
FIG. 10
FIG. 11

FISHHOOK DEVICE AND METHOD OF MAKING SAME

CROSS-REFERENCE TO RELATED APPLICATION

This is a continuation-in-part application of Applicant's prior U.S. application Ser. No. 270,015, filed Nov. 14, 1988, now abandoned.

BACKGROUND OF THE INVENTION

1. Field of the Invention

This invention relates generally to fishhooks, and more particularly to fishhooks adapted for catch-and-release conservation programs.

2. Description of the Prior Art

The encroachment by man on fish habitats, and the increasing number of fishermen, has resulted in dwindling numbers of fish, and particularly game fish. Conservation programs are increasingly important to the survival of particular species. Catch-and-release programs are encouraged, by which fishermen attempt to catch the fish with minimum damage or stress to the fish, so that the fish can be released and will survive after the catch is complete. A principal cause of fish mortality after release is the "gut-hook", wherein the fish swallows the hook and the internal organs of the fish are severely damaged by the hook during the catch.

A number of expanding fishhooks have previously been devised. Pamer, U.S. Pat. No. 2,592,727, discloses an automatic fishhook with an extension adapted to automatically impel the barb of the fishhook into the mouth structure of the fish when the strike occurs. The device will not activate until the fish bites down on the hook, and therefore may not prevent swallowing of the hook.

Prior expanding fishhook devices most commonly include dual-hook constructions, with a pivotal connection between the hooks and a biasing portion that is adapted to thrust the hooks away from one another when the fish bites. These devices have, as their principal aim, the secure hooking of the fish. The multiple hooks can cause extensive damage to the fish, and are contrary to the purpose of catch-and-release programs. These dual-hook constructions cannot usually be made from standard fishhooks, and are therefore often complex and economically impractical.

It would be desirable to provide a fishhook construction which would facilitate the safe release of fish after the catch is complete. It would therefore also be desirable if a fishhook construction would substantially prevent the fish from swallowing the hook and damaging internal organs. It would further be desirable if such a device could easily be adapted to existing fishhooks, whereby manufacture of the device would be facilitated and economically feasible.

SUMMARY OF THE INVENTION

It is an object of the invention to provide a fishhook device which will encourage catch-and-release conservation programs.

It is another object of the invention to provide a fishhook device which will substantially prevent the fish from swallowing the hook.

It is yet another object of the invention to provide a fishhook device which can be created with standard fishhooks.

It is still another object of the invention to provide a fishhook device which will function normally during fishing, but which will efficiently activate when a strike occurs.

It is a further object of the invention to provide a fishhook device which is easy to use.

It is yet another object of the invention to provide a method for making a fishhook device from standard fishhooks.

These and other objects are accomplished by a fishhook device which can include a standard fishhook having a barb, bend, shank and eye. A single piece of wire is attached substantially at one end of the shank of the fishhook, and preferably substantially adjacent to the eye. The wire has an extended position wherein the free end is distanced from the shank of the hook, and a flexed position wherein the wire is adjacent and substantially parallel to the shank. A retaining member is positioned around the wire and the shank to keep the wire in the flexed position, and is the point of attachment for the fishing line. A loop in the wire is preferably provided substantially adjacent to the attached end as a guide for the fishing line. Movement of the hook relative to the fishing line will cause the retaining member to slide over the wire to release the wire to the extended position, such that swallowing of the hook by the fish will be substantially prevented.

The attached end of the wire can be secured to the hook by several suitable means, all of which do not require the expensive re-tooling of fishhook manufacturing equipment. In one embodiment, the wire is wrapped around the shank. In a second embodiment, the attached end is secured by a weld or braze. In a third embodiment, an attachment wire is wrapped around the shank and the attached end to secure the attached end to the shank. In a fourth embodiment, the attached end is wrapped and secured to a rivet which is fastened through the eye of the fishhook. In a fifth embodiment, the attached end is at least partially wrapped around the shank and oppositely threaded through the eye.

The wire has at least one angle or bend adapted to bias the free end of the wire away from the shank of the hook. The bend can include one or more loops formed in the wire for extra biasing strength. These loops can also be utilized for other functions, such as a guide for the fishing line, or to prevent movement of the wire relative to the fishhook. The wire can have several different lengths, but preferably would be substantially as long as the shank of the fishhook. It is possible to provide more than one wire, each wire having a attached end secured substantially adjacent to the eye of the fishhook.

The retaining member is preferably a ring which is adapted to encircle the shank of the fishhook and the wire to keep the wire in the flexed position adjacent and substantially parallel to the shank of the fishhook. The force of the flexed wire on the retaining ring will normally prevent movement of the retaining ring in the absence of an external force from the fish pulling on the hook. One or more stop protrusions can, however, be formed on the wire to prevent accidental movement of the retaining ring and release of the wire.

BRIEF DESCRIPTION OF THE DRAWINGS

There are shown in the drawings embodiments which are presently preferred it being understood, however, that the invention is not limited to the precise arrangements and instrumentalities shown, wherein:

FIG. 8 is a perspective view of a sixth embodiment.

FIG. 9 is a perspective view of the embodiment of FIG. 8, and in an alternate configuration.

FIG. 10 is a side elevation of a seventh embodiment.

FIG. 11 is a perspective view of an eighth embodiment.

DETAILED DESCRIPTION OF THE PREFERRED EMBODIMENTS

Figure 1:
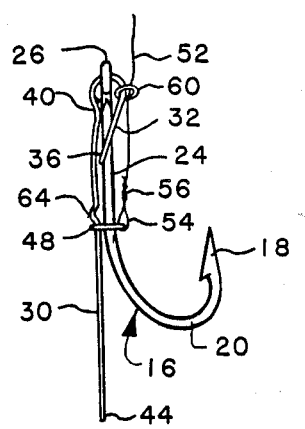
FIG. 1 is a side elevation of a first embodiment of a fishhook device according to the invention.
Figure 2:
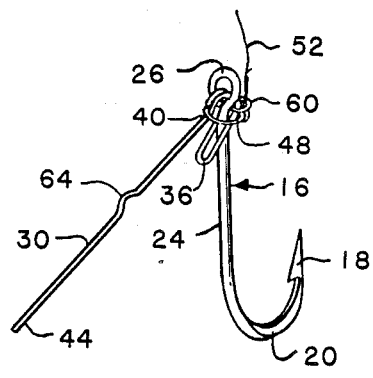
FIG. 2 is a perspective view of the embodiment of FIG. 1, and in an alternate configuration.

There are shown in the FIGS. several embodiments of a fishhook device according to the invention. The fishhook device can importantly be manufactured from a standard fishhook 16, including a barb 18, a bend 20, a shank 24 and an eye 26. In the embodiment of FIG. 1, at least one piece of wire 30 is attached at an end of the shank 24. The wire 30 is attached at an end 32 substantially adjacent the eye 26. The end 32 includes at least a partial wrap around the shank 24, and is oppositely threaded through the eye 26. A biasing bend 40 is adapted to extend the opposite, free end 44 of the wire 30 away from the shank 24 (FIG. 2).

The wire 30 is kept in the flexed position substantially adjacent and parallel to the shank 24 (FIG. 1) by a retaining member such as the retaining ring 48. The retaining ring 48 preferably encircles both of the shank 24 and wire 30. Fishing line 52 is secured to the retaining ring 48 as by a loop 54 and knot 56. Fishing line 52 can be threaded through a guide ring 60 and tied to the retaining ring 48. Relative movement between the hook 16 and the line 52, as when a fish strikes, will cause the retaining ring 48 to move toward the eye 26 and will release the wire 30 to extend outwardly from the shank 24 under the action of the biasing bend 40 (FIG. 2). The wire 30, when extended, substantially prevents the fish from swallowing the hook, and thereby will prevent severe internal damage to the fish during the catch. The fish may then be released following the catch with relatively minor, and survivable, injuries to the mouth area.

The retaining ring 48 will be kept in position prior to the strike by the frictional force created by the outward force of the wire 30 against the retaining ring 48. It is additionally possible to provide a small bend or stop protrusion 64 in the wire 30 which will retard unwanted sliding movement of the retaining ring 48 prior to the strike.

The fishhook device of the invention can be molded from raw materials, but importantly is readily formed from standard fishhooks. The wire 30 can be provided separately and wrapped onto the hook 16 with a minimum of effort. The bend 36, biasing bend 40, and stop protrusion 64 can all be easily formed in the wire 30. The wire 30 is then threaded onto the hook 16. The retaining ring 48 can be threaded over the barb 18 and into position over the shank 24.

Figure 3:
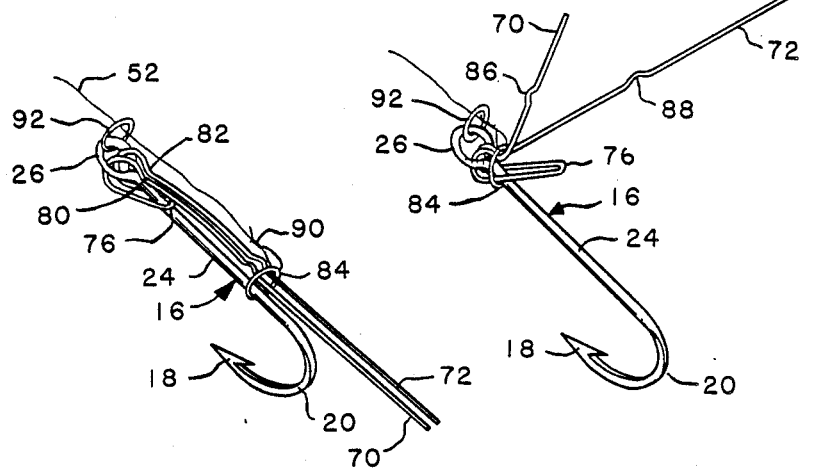
FIG. 3 is a perspective view of a second embodiment.
Figure 4:
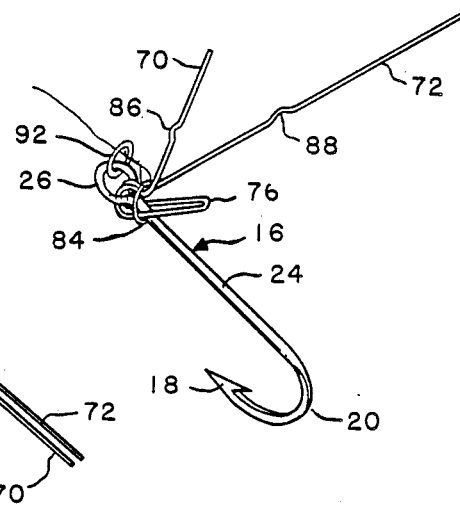
FIG. 4 is a perspective view of the embodiment of FIG. 3, and in an alternate configuration.

Alternative embodiments are possible, such as that shown in FIGS. 3-4. In this embodiment, a single wire is again attached to a standard fishhook 16, however, two wire extensions 70, 72 are provided. A single strand of wire is bent at its midpoint 76, and the resulting strands are partially wrapped around the shank 24 and are oppositely threaded through the eye 26. Biasing bends 80, 82 are provided and adapted to bias the wire members 70, 72, respectively, away from the shank 24 (FIG. 4). A retaining ring 84 is provided to keep the wire members 70, 72 in the flexed position of FIG. 3 against the biasing action of the biasing bends 80, 82. Protrusions 86, 88 can be provided in the wire members 70, 72, respectively, in order to prevent accidental movement of the retaining ring 84 prior to a strike. The fishing line 52 is secured to the retaining ring 84 by suitable means such as the knot 90, and can be threaded through a guide loop 92 that is secured to the eye 26.

Figure 5:
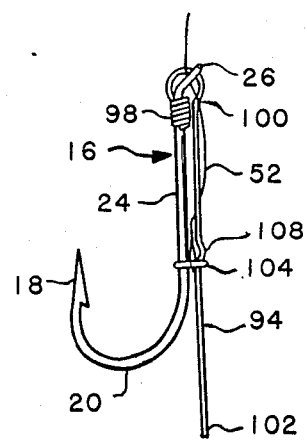
FIG. 5 is a side elevation of a third embodiment.

In FIG. 5, there is shown a third embodiment of the invention. A wire 94 is attached to the shank 24 of the hook 16 by one or more wraps 98 of the wire 94 around the shank 24. The wire 94 passes through the eye 26, and a biasing bend 100 is provided to extend the free end 102 away from the shank 24. A retaining ring 104, as previously described, is provided, and the fishing line 52 is secured to the retaining ring as before. A stop protrusion 108 is formed in the wire 96 to prevent accidental movement of the retaining ring 104.

Figure 6A:
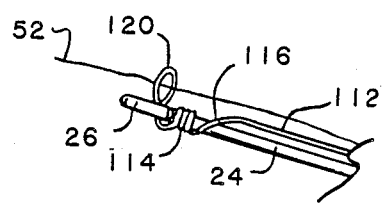
FIG. 6(a) is a perspective view of the embodiment of FIG. 6, and in an alternate configuration.
Figure 6:
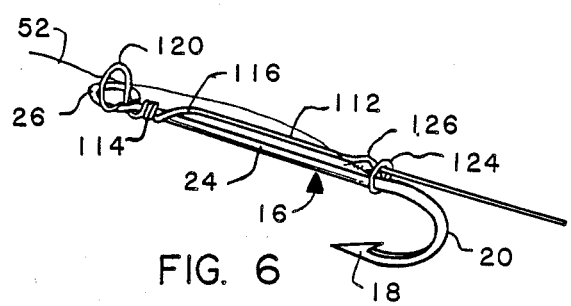
FIG. 6 is a perspective view of a fourth embodiment.

A fourth embodiment is shown in FIGS. 6 and 6(a). The wire 112 is attached to the shank 24 again by one or more wraps 114. A biasing bend 116 is provided as before. An end of the wire 112 adjacent to the wraps 114 is formed into a guide loop 120 through which the fishing line 52 passes. The guide loop 120 is dimensioned to prevent passage through the eye 26, and thereby also prevents movement of the wire 112 relative to the shank 24. A retaining ring 124 and stop protrusion 126 can also be provided.

Figure 7:
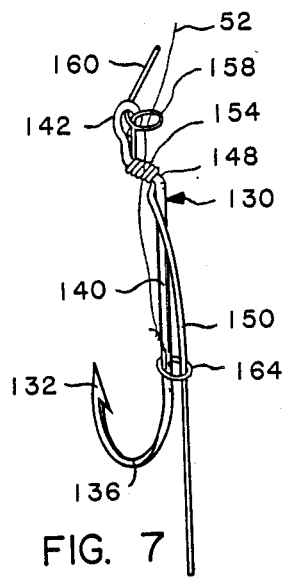
FIG. 7 is a perspective view of a fifth embodiment.

A fifth embodiment is shown in FIG. 7. The fishhook 130 is also standard, but of the design used with plastic worms. The fishhook 130 includes a barb 132, bend 136, shank 140 and eye 142. The eye 142 is offset from the shank 140 by an offset shank portion 148. The wire 150 is attached to the fishhook 130 by one or more wraps 154, preferably around the offset shank portion 148. A guide loop 158 is formed at the attached end, and is dimensioned substantially to prevent passage through the eye 142 of the fishhook 130. An extension 160 of the Wire 150 may be provided beyond the guide loop 158 to permit the attachment of a plastic worm by impaling the head onto the extension 160. The fishing line 52 is passed through the guide loop 158 and is secured to a suitable retaining ring 164, which acts to retain the wire 150 in the flexed position adjacent the shank 140.

A sixth embodiment is shown in FIGS. 8-9. A wire is bent at a mid-point 170 into wire extensions 174, 176. The mid-point 170 and adjacent portions of the wire extensions 174, 176 are attached to the shank 24 by a weld or braze 180. The wire extensions 174, 176 include biasing bends 184, 186 substantially adjacent to the eye 26 of the fishhook 16. The biasing bends 184, 186 bias free ends 188, 190 of the wire extensions 174, 176 away from the shank 24 (FIG. 9). A fishing line 52 is secured to a retaining ring 192 which keeps the wire extensions 174, 176 in the flexed position adjacent and substantially parallel to the shank 24 prior to a strike. Stop protrusions 194, 196 can be formed in the wire members 174, 176, respectively, as previously described.

A seventh embodiment of the invention is shown in FIG. 10. In this embodiment, the wire 200 is secured to the shank 24 by an attachment wire 204 that is wrapped around both of the shank 24 and the attached end 206 of the wire 200. A portion 208 extends through the eye 26 and a biasing bend 210 is adapted to extend a free end 214 of the wire 200 away from the shank 24. A retaining ring 216, as previously described, is adapted to engage the wire 200 to retain the wire in the flexed position, adjacent and substantially parallel to the shank 24. The fishing line 52 is attached to the retaining ring 216. A stop protrusion 218 can also be provided to prevent accidental movement of the retaining ring 216.

An eighth embodiment of the invention is shown in FIG. 11. In this embodiment, a wire 222 is wrapped about a rivet 224 which is fastened through the eye 26. A biasing bend 226 is formed in the wire 222 and is adapted to extend a free end 230 of the wire 222 to a position distanced from the shank 24 as shown in FIG. 11. A retaining ring 232 is provided to secure the wire 222 in the flexed position adjacent and substantially parallel to the shank 24. The fishing line 52 is attached to the retaining ring 232, and may be passed through a guide loop 236 formed in the wire 222 substantially adjacent to the attached end.

Figure 12:
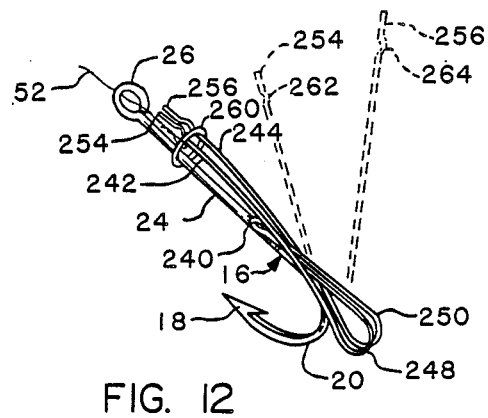
FIG. 12 is a perspective view of a ninth embodiment.

A ninth embodiment of the invention is shown in FIG. 12. A wire is welded or brazed at its mid-point 240 to the shank 24 at a point on the shank 24 that is substantially opposite to the eye 26. The wire extensions 242, 244 so formed include 180 degree biasing bends 248, 250, respectively. The biasing bends 248, 250 bias free ends 254, 256 of the wire extensions 242, 244, respectively, to a position distanced from the shank 24 (phantom lines in FIG. 12). A retaining ring 260 is provided to secure the wire members 242, 244 in the flexed position adjacent to shank 24. The fishing line 52 is secured to the retaining ring 260 and is threaded through the eye 26 of the fishhook 16. Stop protrusions 262, 264 can be provided as previously described to prevent accidental movement of the retaining ring 260.

The fishhook device according to the invention can be manufactured with standard fishhooks, such as the fishhooks 16 and 130. This is an important benefit, since manufacturing equipment for fishhooks is extremely expensive, and costly to re-tool for new products. The present invention can be practiced by adding wire constructions according to the invention to the fishhooks by wrapping, strapping, welding, brazing or other suitable attachment methods. The product can be manufactured using light manufacturing equipment and techniques. In any event, heavy manufacturing equipment or re-tooling of existing fishhook manufacturing equipment is not necessary.

The wire of the invention can be manufactured from several suitable materials, which must, in any case, have suitable durability, elasticity and rigidity. The material should also be substantially rust-proof. Metals and metal alloys, preferably stainless steels, are currently preferred materials. The thickness of the wire will be relative to the size of the fishhook. Small fishhooks for small fresh water and salt water applications will require a relatively small gauge wire. Heavy fishhooks for large, offshore fishing will require a heavier gauge wire.

This invention is capable of taking alternative embodiments without departing from the spirit or essential attributes thereof, and accordingly, reference should be had to the following specification, rather than to the foregoing claims, as indicating the scope of the invention.

I claim:

1. A fishhook device including a fishhook having a front side and a back side, a barb on the front side, a bend, a shank and an eye portion, the improvement comprising:
    at least one piece of wire attached by substantially encircling the fishhook shank adjacent to the eye portion forming an attached end, and having a free end opposite the attached end;
    at least one biasing bend substantially adjacent to the attached end and being adapted to bias the free end of the wire to a position distanced from the shank of the hook on the back side of the fishhook opposite to the front side with the barb; and,
    a retaining member at least partially encircling the wire and the shank of the fishhook, and adapted for sliding movement relative to said wire and to said shank, whereby said fishing line can be secured to said retaining member and a fish strike on the fishhook will cause relative movement between the fishing line and the retaining member, and whereby said retaining member will release said wire and said wire will move under the force of said biasing bend to said position distanced from said shank to prevent the fish from swallowing the fishhook.

2. The fishhook device of claim 1, wherein a portion of said wire substantially adjacent to said attached end is formed as a loop, whereby said loop will serve as a guide for said fishing line.

3. The fishhook device of claim 1, further comprising a stop protrusion on said wire adapted to prevent accidental movement of said retaining member.

4. The fishhook device of claim 3, wherein said stop protrusion is formed by a bend in said wire.

5. The fishhook device of claim 1, wherein attached end is secured to said fishhook by one or more wraps around said shank.

6. The fishhook device of claim 1, wherein said attached end is secured by at least one of the group consisting of welds and brazes.

7. The fishhook device of claim 1, wherein said attached end is secured to said fishhook by an attachment wire, said attachment wire being wrapped around both of the shank and the attached end of the wire member.

8. The fishhook device of claim 1, wherein said attached end is secured to a rivet fastened through said eye of the fishhook.

9. The fishhook device of claim 1, wherein said wire is attached to said shank substantially at its mid-point, to define first and second sides of said wire member, each side of said wire member having a biasing bend adapted to bias a free end of said side away from said shank of said fishhook, said retaining member being adapted to encircle each of said wire sides and said shank of said fishhook, movement of said retaining member permitting release of said first and second sides to the extended position against the mouth of the fish, and to thereby prevent swallowing of the fishhook by the fish.

10. The fishhook device of claim 1, wherein said attached end is partially wrapped around said shank and oppositely threaded through the eye.

11. The fishhook device of claim 1, wherein said eye of said fishhook is offset from said shank by an offset shank portion, said attached end of said wire being attached to the offset portion of said shank, and a guide loop being formed in said wire substantially adjacent to said eye, said guide loop being dimensioned to prevent passage through said eye, a portion of said attached end of said wire extending beyond the eye of said fishhook, whereby the head of a plastic worm can be impaled on said extended portion.

12. The fishhook device of claim 5, wherein an end of the wire is formed as a guide loop, said guide loop being dimensioned to prevent passage through said eye, said guide loop acting as a guide for said fishing line and preventing movement of said wraps of said attached end relative to the shank of the fishhook.

13. A method for modifying a fishhook of the type having a front side and a back side, a barb on the front side, a bend, a shank and an eye, said method comprising the steps of:
  attaching substantially around said fishhook, shank adjacent to the eye portion an end of a wire, said opposite end of said wire being free and being on the backside of the fishhook, said wire having a biasing bend substantially adjacent to said attached end adapted to bias said free end of said wire to an extended position distanced from the shank of the fishhook;
  passing a retaining ring over the barb of said fishhook and positioning said retaining ring around each of said wire and said shank of the fishhook, whereby said wire will be held in a flexed position adjacent and substantially parallel to said shank; whereby a fishing line can be attached to said retaining ring, and movement of said fishhook relative to said fishing line will cause sliding movement of said retaining ring over said wire and said shank to release said wire from the flexed position to the extended position distanced from said shank, said extended position of said shank being adapted to prevent swallowing of the fishhook by the fish.

14. The method of claim 13, wherein said attaching step is performed by wrapping said wire on a portion of said shank substantially adjacent to said eye, and further comprising the step wherein an end of said wire adjacent said wraps is passed through said eye and formed into a loop dimensioned to prevent passage through said eye, said loop acting to prevent movement of said wire wraps relative to said fishhook, and acting as a guide for said fishing line.

15. The method of claim 13, wherein said step of attaching said attached end to said shank is accomplished by at least one of welding and brazing.

16. The method of claim 13, wherein said step of attaching said attached end to said shank is accomplished by attaching said attached end to a rivet, and fastening said rivet through the eye of said fishhook.

17. The method of claim 13, wherein said step of attaching said attached end to said shank comprises the step of wrapping a length of attachment wire around both of the attached end and the shank.

18. The method of claim 13, wherein said step of attaching said attached end to said shank comprises the step of at least partially wrapping said attached end around said shank and oppositely threading said wire through said eye.

19. The method of claim 13, further comprising the step of forming a stop protrusion in said wire adapted to prevent accidental movement of said retaining ring, said stop protrusion being formed by bending a portion of said wire.

20. The method of claim 13, wherein said attachment step comprises the wrapping of said wire at least partially about said shank substantially at the mid-point of the wire, producing first and second wire sides, said biasing bends being formed in each of said wire sides to form dual wire extensions, said retaining ring being positioned around each of said shank and said first and second wire extensions.

21. The method of claim 13, wherein said fishhook is of the type having an eye offset from the shank by an offset shank portion, and wherein said attachment step comprises the step of attaching said wire to said offset shank portion, and further comprising the step of forming a wire loop in a portion of said wire substantially adjacent to said eye, said wire loop serving as a guide for said fishing line, and further comprising the step of providing an extension of said wire from said wire loop and opposite to said free end, whereby the head of a plastic fishing worm can be impaled on said extension.

22. A fishhook device including a fishhook having a front side and a backside, a barb on the front side portion, a bend portion, and a shank portion, said fishhook device further comprising:
  at least one piece of wire attached by substantially encircling the fishhook shank adjacent to the eye portion forming an attached end, and having a free end opposite the attached end;
  at least one biasing bend substantially adjacent to the attached end and being adapted to bias the free end of the wire to a position distanced from the shank of the hook on the back side of the fishhook opposite to the front side with the barb; and,
  a retaining member at least partially encircling the wire and the shank of the fishhook, and adapted for sliding movement relative to said wire and to said shank, whereby said fishing line can be secured to said retaining member and a fish strike on the fishhook will cause relative movement between the fishing line and the retaining member, and whereby said retaining member will release said wire and said wire will move under the force of said biasing bend to said position distanced from said shank to prevent the fish from swallowing the fishhook.

* * * * *